July 16, 1957  V. SALOMÉ ET AL  2,799,374
TIMED DELAYED-ACTION CLUTCHING DEVICE FOR LATHE
MECHANISM OR SIMILAR MACHINE Filed Dec. 7, 1953  3 Sheets-Sheet 1

2,799,374
Patented July 16, 1957

United States Patent Office

2,799,374

TIMED DELAYED-ACTION CLUTCHING DEVICE FOR LATHE MECHANISM OR SIMILAR MACHINE

Victor Salomé and Clotaire Salomé, Nanterre, France

Application December 7, 1953, Serial No. 396,554

Claims priority, application France December 11, 1952

5 Claims. (Cl. 192—30)

This invention relates to a control device for a metal cutting machine permitting interrupting feeding of the cutting tool carriage on the bed of the machine and resuming feeding of said cutting tool carriage from the position in which it stopped and at the rate of feed to which said carriage was subjected when its feed was interrupted, without interrupting the rotation of the spindle of the machine.

When a cycle of machining operations is carried out on a lathe or similar machine tool, it may be necessary to withdraw a tool at the end of a cut or an operation and later to restore this tool to the precise working position for a new cut or a new machining operation. It is an object of the present invention to permit the correct repositioning of a tool on a lathe or similar machine, after said tool has been withdrawn, while leaving the spindle of the machine rotating.

The invention has as its object the new industrial product consisting of control means in a metal cutting machine comprising a delayed-action clutch device between two coaxial shaft halves forming an intermediate transmission shaft in a lathe mechanism or similar machine tool, one of the shaft halves having its rotation controlled by the driving mechanism of the spindle and the other shaft half transmitting its movements by means of a reduction gear device to a shaft provided to control the displacement of a tool in synchronism with the rotation of the spindle; this clutch device is arranged to provide a delayed-action engagement, that is to say that after disengagement, re-engagement cannot take place until the driving shaft half has completed at least a predetermined number of revolutions or a multiple of this number of revolutions; it is characterised by the combination of the following elements:

A sleeve member mounted for sliding on the end of the shaft half rotating in synchronism with the spindle, said sleeve member being provided with a dog or projecting portion projecting towards the other coaxial shaft half which it is to drive;

An epicyclic gear train comprising: a pinion fixed to the end of the shaft half rotating in synchronism with the spindle; a crown wheel rigidly secured to the second shaft half and a linking member or bush carrying at least one planetary wheel in mesh with said pinion and said crown wheel, the crown wheel and the linking member each having a cut-away portion or cut out, the respective cut-away portions, when in radial alignment, permitting the penetration of the dog or projecting portion of the sliding sleeve member which can then drive or connect, as a whole and without any play, the members of the epicyclic gear train, and consequently the driven shaft half;

Actuating means for displacing the sliding sleeve member so as to push its dog into the above-mentioned cut-away portions or out of said cut-away portions, that is to say into the engaging and disengaging positions, respectively.

The actuating means used to displace the sliding sleeve may be controlled directly by hand, or be semi-automatic or even automatic; they may be mechanical, electrical, hydraulic or pneumatic, for example.

According to the invention, the members of the epicyclic gear train are selected in such a manner that when the crown wheel remains fixed, the planet-wheel carrier or linking member completes a number of revolutions equal to that which would be completed by the shaft controlling the displacement of the tool if the clutch was engaged. For example, if the shaft half or driving shaft means, which is constantly rotating at the same time as the spindle, completes three revolutions per minute, while the shaft which controls the displacement of the tool or rotating shaft portion of the driven shaft means completes one revolution per minute, the planet-wheel carrier or linking member completes one revolution per minute when the sliding sleeve member is in the disengaged position, that is to say, the respective diameters of the pitch-circles of the planet pinion and the crown wheel should be in the ratio of 1:2, the diameter of the pitch-circle of the planetary gear being half the diameter of the pitch circle of the pinion. In other words, as a result of the arrangement of the clutch device according to the invention, when engagement takes place after a certain period of disengagement, the driving of the rotating shaft portion which controls the displacement of the tool must be resumed in the exact position which it would have had if it had not ceased to be driven; therefore disengagement followed by engagement after any lapse of time in no way modifies the position of the tool.

The device according to the invention may be used to particular advantage in machining operations on a lathe or similar machine, for example when these operations comprise the cutting of a thread by means of a tool mounted on a carriage, the longitudinal displacement of which is controlled by control means including a cam secured to a rotating shaft portion which is connected to the spindle by clutching means ensuring the rotation of said cam and of the spindle at speeds having a predetermined ratio when said clutching means is engaged, said clutching means including an epicyclic gear train in operation when said clutching means is disengaged to interrupt the rotation of said cam, said train being interconnected between two driving and driven shaft means according to the invention, one of these shaft means rotating at the same time as the lathe spindle and the other driving the cam-shaft or rotating shaft portion at a reduced speed as a result of a reduction gear device of any known type.

One embodiment illustrated on the accompanying diagrammatic drawing, will now be described by way of example, without any limitation of the scope of the invention, by way of illustrating the potentialities of the invention.

Figure 1:
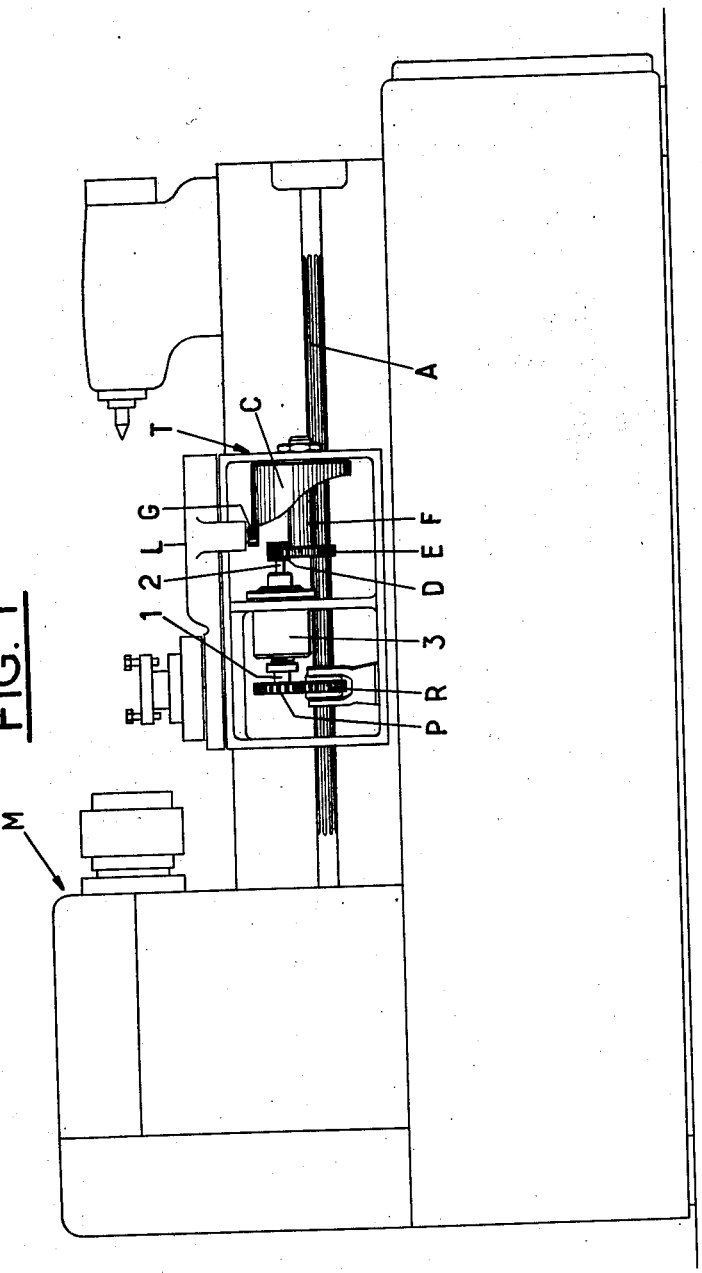
Figure 1 is a front view, in partial section, parallel to the axis of the spindle of a machine similar to a lathe equipped for automatic thread-cutting and comprising control means including a delayed-action clutching device according to the invention.

The machine M illustrated on Figure 1 is an automatic thread-cutting machine similar to a lathe; it has a saddle T and a splined shaft A rotating at the same time as the spindle. The saddle T carries a toothed wheel R sliding on the shaft A; the wheel R is in mesh with a pinion P rigidly connected to a driving shaft half 1 coaxial with a driven shaft half 2; the shaft 2 may be fixed for rotation with the shaft 1 by means of a clutching device or clutching means 3 according to the invention. The driven shaft 2 carries at its free end a pinion D in mesh with a toothed wheel E keyed onto the rotating shaft portion F of a cam C which controls the displacement of a cutting tool carriage L sliding longitudinally on the saddle T, the cam C acting, as it rotates, on a roller G rigidly connected to the cutting tool carriage L, the latter being constantly urged by suitable resilient means in such a manner that the roller G rests against the cam C.

After disengagement, the clutching device or clutching means 3 permits re-engagement in such a position that the cam C retains the position in relation to the spindle which it would have had if there had been no disengagement; in other words it is possible to disengage and re-engage as often as necessary without stopping the spindle, while retaining a correct longitudinal position for the cutting tool carriage L on which the tool-holder is mounted.

Figure 2:
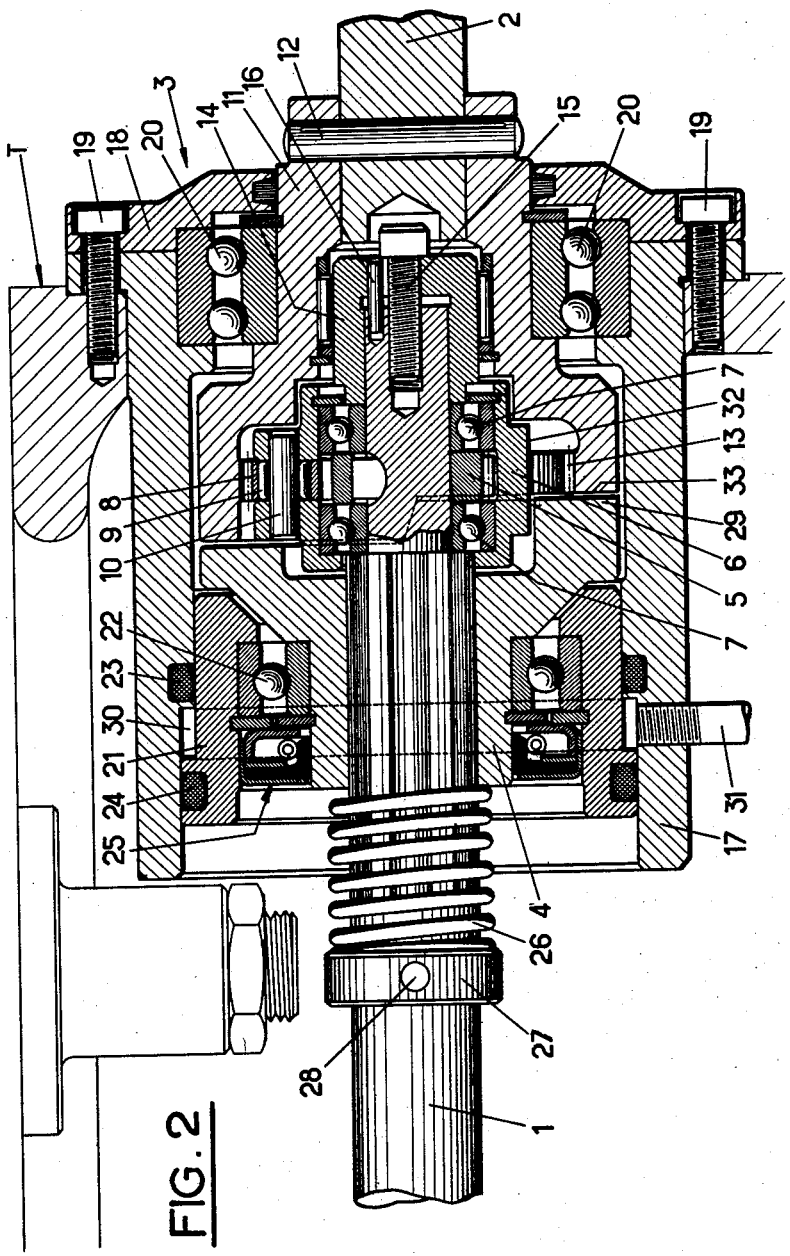
Figure 2 is an axial section through the clutching device according to the invention.

The clutching means 3 uniting the shaft halves 1 and 2 (see Figure 2) comprises among other members: a sleeve member 4 mounted for sliding on the driving shaft half 1; a toothed pinion 5 fixed to the shaft half 1; a bush or linking member 6 mounted loose on the shaft half 1 by means of ball bearings 7, said bush 6 carrying a pinion 8 mounted by means of needles 9 on a shaft 10; a member 11 fixed by means of a pin 12 to the shaft half 2 and provided with an internally toothed crown-wheel or gear 13 in mesh with the planet wheel or planetary gear 8, itself in mesh with the pinion 5. The ball bearings 7 and the pinion 5 are pressed against a shoulder of the shaft 1 by means of a cap 14 covering the end of this shaft; the cap 14 is held by a screw 15, and a pin 16 prevents it from rotating on the end of the shaft 1. The assembly of members mentioned above is mounted in a cylinder 17 with a cover 18, fixed to the saddle T of a lathe or similar machine by screws 19; the driven shaft half 2 is centered by a ball bearing 20; 21 is an annular piston centered on the sleeve 4 by means of a ball bearing 22; 23 and 24 are sealing rings between the piston 21 and the interior of the cylinder 17; 25 is a sealing joint arranged against the bearing 22 between the piston 21 and the sleeve 4; a spiral spring 26 urges the sleeve 4 against the sleeve 11 and the bush 6; this spring 26 rests against a ring 27 held by a pin 28 on the shaft half 1. The sleeve member 4 has round approximately a quarter of its periphery a projecting portion 29 forming a dog which ensures the engagement of the driven shaft half 2 with the driving shaft half 1 when it is engaged (which is its normal position) in corresponding cut-away or cut out portions such as 32 and 33 in the bush 6 and the member 11 respectively. The clutching means 3, in its usual position, is engaged; an annular chamber 30 is formed between the piston 21 and the cylinder 17; a tube 31 is fixed, for example by screwing, to the cylinder 17 and opens into the chamber 30. The tube 31 may communicate by means of a suitable control device not illustrated, either with a source of compressed air or with the atmosphere; when the tube 31 is in communication with the atmosphere, the clutching means is engaged, the spring 26 ensuring the engagement of the dog or projecting portion 29 in the said corresponding cut-away portions in the member 11 and the linking member 6 carrying the planetary gear 8; as soon as the tube 31 is brought into communication with the source of compressed air, the piston 21, and with it the sleeve member 4, is pushed against the spring 26 which is compressed, the dog 29 is disengaged and ceases to be in mesh with the said corresponding cut-away portions in the member 11 and the linking member 6: the shaft half 2 therefore ceases to be driven.

Figure 3:
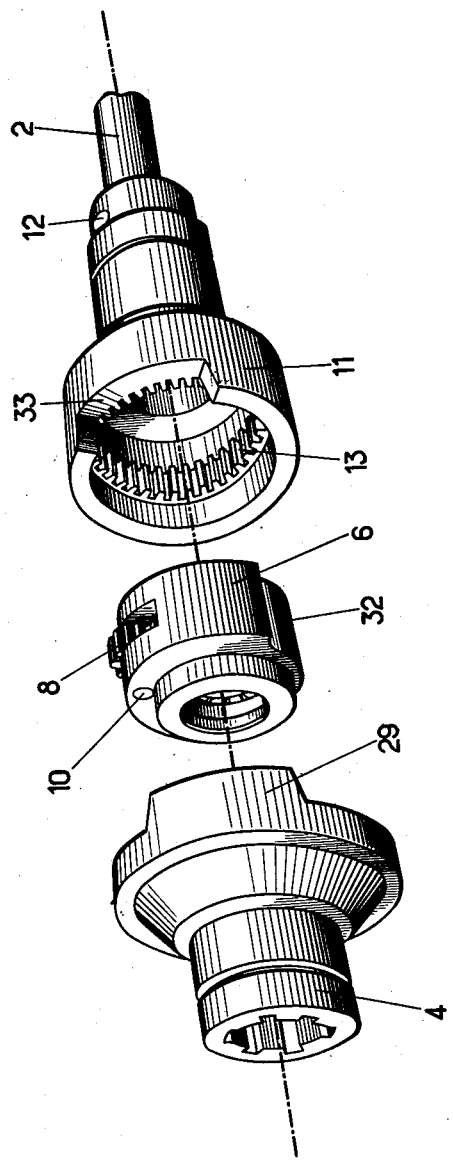
Figure 3 is a perspective view of the main parts of the clutching device in Figure 2, after dismantling, the axes of the main parts remaining aligned.

Figure 3 shows the sleeve 4 with its dog 29, the linking member 6 which carries the planet wheel or planetary gear 8 rotating about the shaft 10, the member 11 held by the pin 12 on the shaft half 2, and the internally toothed crown wheel 13 of said member 11. The linking member 6 has a cut-away portion 32 and the member 11 a cut-away portion 33, the cut-away portions 32 and 33 permitting, when they are in alignment, the penetration of the dog or projecting portion 29, said penetration corresponding to the engaged position, as previously explained.

The ratios of the diameters of the teeth of the members 5 to 8 and 13, forming a cycloid gear train, are determined in such a manner that when the shaft 2 is disengaged, the linking member 6 which carries the planetary gear 8 is driven (as a result of the rolling of this planetary gear inside the teeth 13) at a speed equal to the number of revolutions per minute completed by the cam-shaft or rotating shaft portion F when the clutching means 3 is engaged. For example, if the shafts 1 and 2 complete three revolutions while the cam C completes one revolution, in the disengaged position, it is necessary for the linking member 6 to complete one revolution while the driving shaft half 1 completes three revolutions; in this case the pitch diameter of the crown wheel 13 will be double the pitch diameter of the pinion 5 and the pitch diameter of the planetary gear 8 will in turn be half that of the pinion 5. This arrangement makes it possible, when one part has been threaded and the tool withdrawn to perform another operation, and when the latter has been performed, for the threading tool to be replaced in the correct position without it being necessary to interrupt the rotation of the machine spindle.

Needless to say, various changes, improvements or additions may be made to the embodiment described, or certain devices may be replaced by equivalent devices, without affecting the general arrangement of the invention. For example, it would be possible to make a device according to the invention in which the cycloid gear train comprises several planet wheels; the sleeve member sliding on the driving shaft half could have several dogs cooperating with corresponding cut-away portions in the linking member 6 and the member 11, but it should be noted that these projecting portions and cut out portions should be arranged so as not to permit engagement except in a single specific relative position of the shaft halves 1 and 2; this means that the said projecting portions and cut out portions must not be arranged symmetrically round the common axis of the driving shaft 1 and driven shaft 2.

What we claim as new and desire to secure by Letters Patent of the United States is:

1. A machine tool drive mechanism comprising driving shaft means, driven shaft means including a shaft portion rotating with said driven shaft means, clutching means having an engaged position in which the clutching means operatively couples said driving shaft means and said driven shaft means for their rotation at the same speed and having a disengaged position in which the clutching means uncouples said driven shaft means from said driving shaft means to thereby interrupt rotation of said driven shaft means and said shaft portion, and actuating means for moving said clutching means to either of said positions, said clutching means including a epicyclic gear train connecting said driving shaft means and said driven shaft means which comprises a linking member, a planetary gear mounted on said linking member, an internally toothed gear attached to said driven shaft means, and a pinion attached to said driving shaft means for rotation therewith, said planetary gear being mounted for rotation between said pinion and said internally toothed gear, the respective diameters of said gears and of said pinion affording, upon disengagement of said clutching means, rotation of said linking member about the axis of said pinion at the speed equal to the speed of rotation of said rotating shaft portion when said clutching means is engaged, whereby during said disengagement of said clutching means said linking member completes a number of revolutions equal to the number of revolutions said rotating shaft portion would have completed if said clutching means had been engaged to thereby permit said internally toothed gear to remain fixed during continuous rotation of said driving shaft means.

2. A machine tool drive mechanism including a time delayed action clutch comprising a first shaft half, a sleeve member slidingly mounted on the free end portion of said first shaft half, a pinion rigidly secured on the free end portion of said first shaft half, a second shaft half, a speed reducing device including a third shaft half connected to drive the tool, said speed reducing device being connected to said second shaft half, an internally toothed crown member rigidly secured to said second shaft half, said first and second shaft halves being mounted in coaxial and adjacent relation for transmitting the rotating motion of said second shaft half through said speed reducing device, a bush member, at least one planet gear member rotatably carried by said bush member and meshing with said pinion and with said crown member, said sleeve member being longitudinally provided on the periphery of the outer end thereof with a portion facing the opposite outer end of said crown member, the periphery of said bush member and of said opposite outer end of said crown member respectively being provided with correspondingly alignable fittingly engaging counterportions, actuating means located into said sleeve member for longitudinally urging said sleeve member toward said ground member and thereby rigidly interconnecting said last mentioned members in predetermined radially aligned relation by the interengagement of said correspondingly alignable portion and counterportions, and means for disengaging said interengaging portion and counterportions, said pinion and said planet gear member being so arranged that when said crown member remains stationary said bush member carrying said planet gear rotates a number of revolutions equal to the number of revolutions which would be rotated by said third shaft half if said clutch were in engaged position.

3. A machine tool drive mechanism including a time delayed action clutch comprising a first shaft half, a sleeve member slidingly mounted on the free end portion of said first shaft half, a pinion rigidly secured on the free end portion of said first shaft half, a second shaft half, a speed reducing device including a third shaft half connected to drive the tool, said speed reducing device being connected to said second shaft half, an internally toothed crown member rigidly secured to said second shaft half, said first and second shaft halves being mounted in coaxial and adjacent relation for transmitting the rotating motion of said second shaft half through said speed reducing device, a bush member, at least one planet gear member rotatably carried by said bush member and meshing with said pinion and with said crown member, said sleeve member being longitudinally provided on the periphery of the outer end thereof with a portion facing the opposite outer end of said crown member, the periphery of said bush member and of said opposite outer end of said crown member respectively being provided with correspondingly alignable fittingly engaging counterportions, means for moving said sleeve member and comprising a piston centered on said sleeve member and forming with the internal wall of said sleeve member an annular chamber, control means communicating with said annular chamber whereby said chamber will alternately be connected with a source of compressed fluid and with the atmosphere, a spring mounted on said first shaft half and pushing against said sleeve member to maintain the clutch engaged, the disengagement of the clutch being effected at will by admitting the compressed fluid into the annular chamber, said pinion and said planet gear member being so arranged that when said crown member remains stationary said bush member carrying said planet gear rotates a number of revolutions equal to the number of revolutions which would be rotated by said third shaft half if said clutch were in engaged position.

4. A machine tool drive mechanism comprising driving shaft means, driven shaft means including a shaft portion, clutching means including disconnectable means coupling said driving shaft means for rotation at equal speed with said driven shaft means when connected and when disconnected uncoupling said driven shaft means from said driving shaft means to thereby interrupt rotation of said driven shaft means and said shaft portion, said clutching means further including an epicyclic gear train having a linking member rotating relative to the gears of the train when said disconnectable means is disconnected at a speed equal to the speed of rotation of said shaft portion, said linking member being connected to said disconnectable means so as to be engaged thereby and remain stationary when said disconnectable means is connected.

5. A machine tool drive mechanism comprising driving shaft means, driven shaft means including a shaft portion rotating upon rotation of said driven shaft means, clutching means having an engaged position in which the clutching means operatively couples said driving shaft means and said driven shaft means for their rotation at the same speed and having a disengaged position in which the clutching means uncouples said driven shaft means from said driving shaft means to thereby interrupt rotation of said driven shaft means and said shaft portion, and actuating means for moving said clutching means to either of said positions; said clutching means including an epicyclic gear train connecting said driving shaft means and said driven shaft means, said epicyclic gear train including linking means between the gears of said gear train rotating around said driving shaft means when said clutching means is in said disengaged position at a speed corresponding to the rotational speed of said shaft portion and remaining stationary when said clutching means is in engaged position.

References Cited in the file of this patent

UNITED STATES PATENTS

| | | |
|---|---|---|
| 1,306,330 | Drew | June 10, 1919 |
| 1,520,494 | Drake | Dec. 23, 1924 |
| 1,565,639 | Gordon | Dec. 15, 1925 |
| 1,709,339 | Cockburn | Apr. 16, 1929 |
| 1,775,737 | Schaerer | Sept. 16, 1930 |
| 1,902,657 | Merwin et al. | Mar. 21, 1933 |
| 2,021,720 | French | Nov. 19, 1935 |
| 2,189,482 | Van Hamersveld | Feb. 6, 1940 |

FOREIGN PATENTS

| | | |
|---|---|---|
| 658,077 | France | Jan. 22, 1929 |